(12) United States Patent
Kayanuma

(10) Patent No.: US 7,719,613 B2
(45) Date of Patent: May 18, 2010

(54) CRADLE FOR DIGITAL CAMERA

(75) Inventor: Yasunobu Kayanuma, Asaka (JP)

(73) Assignee: Fujifilm Corporation, Tokyo (JP)

( * ) Notice: Subject to any disclaimer, the term of this patent is extended or adjusted under 35 U.S.C. 154(b) by 468 days.

(21) Appl. No.: 11/500,451

(22) Filed: Aug. 8, 2006

(65) Prior Publication Data

US 2006/0268162 A1    Nov. 30, 2006

Related U.S. Application Data

(62) Division of application No. 10/166,366, filed on Jun. 11, 2002, now Pat. No. 7,253,840.

(30) Foreign Application Priority Data

Jun. 11, 2001 (JP) ............................. 2001-175394
Jul. 11, 2001 (JP) ............................. 2001-210597

(51) Int. Cl.
    *H04N 5/225*    (2006.01)
    *H04M 1/00*     (2006.01)
    *H04B 1/08*     (2006.01)

(52) U.S. Cl. ................. 348/375; 348/207.1; 348/207.2; 348/373; 348/374; 348/376; 379/428.01; 379/428.03; 379/428.04; 379/454; 379/455; 455/575.1; 455/575.3; 455/347; 455/348

(58) Field of Classification Search ... 348/207.1–207.2, 348/372–376, 211.2–211.4; 396/419–428; 429/96–100; 5/101–109; 280/31; 248/139; 68/114; 455/573, 575.1, 90.3, 128, 347–349, 455/351; 379/428.01, 428.02, 428.04, 454, 379/455

See application file for complete search history.

(56) References Cited

U.S. PATENT DOCUMENTS 3,291,179 A * 12/1966 Lang ....................... 206/316.2

(Continued)

FOREIGN PATENT DOCUMENTS

JP    58-208712 A    12/1983

(Continued)

*Primary Examiner*—Jason Chan
*Assistant Examiner*—Michael Osinski
(74) *Attorney, Agent, or Firm*—Birch, Stewart, Kolasch & Birch, LLP

(57) ABSTRACT

Free setting of the angle or direction of a camera is available while the camera is being inserted into a cradle. A cradle for a digital camera is provided, which is capable of confirming a display screen of the camera, changing the recording medium or battery, or mounting or demounting a communication cable or the like while the camera is being mounted on the cradle without deteriorating the camera holding. The cradle has a structure such that a tripod screw hole is formed on the bottom surface of the cradle, thereby capable of fixing the cradle to a tripod while the digital camera is being inserted into the cradle. By making the height of rubber pads equal or higher than that of a tripod base, the cradle can be stably placed on a desk or the like. The cradle also has a structure that, among the walls holding the camera, a part of the walls that cover a liquid-crystal monitor of the camera, a media slot for a memory card, a terminal part including a power supply terminal or USB terminal is constituted by movable walls. The movable walls can be used as a simple tripod by employing a free stop structure or click stop structure.

17 Claims, 14 Drawing Sheets

U.S. PATENT DOCUMENTS

| | | | |
|---|---|---|---|
| 5,281,988 A | | 1/1994 | Martin |
| 5,373,333 A | * | 12/1994 | Kawada et al. ............... 353/122 |
| 5,815,205 A | | 9/1998 | Hashimoto et al. |
| D403,338 S | | 12/1998 | Dunn |
| 6,138,826 A | * | 10/2000 | Kanamori et al. ........ 206/316.2 |
| 6,540,415 B1 | * | 4/2003 | Slatter et al. ................. 396/428 |
| 6,571,056 B2 | * | 5/2003 | Shimamura et al. ........... 396/27 |
| 6,614,481 B1 | * | 9/2003 | Sasaki ......................... 348/373 |
| 6,812,971 B2 | * | 11/2004 | Terane ......................... 348/375 |
| 6,950,142 B2 | * | 9/2005 | Soumi et al. ................. 348/375 |
| 7,233,360 B2 | * | 6/2007 | Kanamori ................... 348/375 |
| 7,330,215 B2 | * | 2/2008 | Ito .............................. 348/375 |
| 7,538,792 B2 | * | 5/2009 | Takahashi ................ 348/207.1 |
| 2002/0029087 A1 | | 3/2002 | Mayne et al. |
| 2002/0071035 A1 | | 6/2002 | Sobol |
| 2003/0076442 A1 | * | 4/2003 | Kawaguchi et al. ......... 348/375 |

FOREIGN PATENT DOCUMENTS

| | | |
|---|---|---|
| JP | 6-86122 A | 3/1994 |
| JP | 06-44050 | 6/1994 |
| JP | 06351012 A | 12/1994 |
| JP | 7-336566 A | 12/1995 |
| JP | 8-304902 A | 11/1996 |
| JP | 9-222541 A | 8/1997 |
| JP | 9-230231 A | 9/1997 |
| JP | 2000-232599 A | 8/2000 |
| JP | 2001-66658 A | 3/2001 |
| JP | 2002359759 A2 | 12/2002 |

* cited by examiner

PRIOR ART

CRADLE FOR DIGITAL CAMERA

CROSS REFERENCE TO RELATED APPLICATIONS

This application is a Divisional of application Ser. No. 10/166,366, filed on Jun. 11, 2002 now U.S. Pat. No. 7,253,840, the entire contents of which are hereby incorporated by reference and for which priority is claimed under 35 U.S.C. §120.

BACKGROUND OF THE INVENTION

1. Field of the Invention

The present invention relates to a cradle for a digital camera, and in particular to a structure of a cradle suitable for a digital camera having a communication function with an external device such as a personal computer.

2. Description of the Related Art

Japanese Utility Model Application Publication No. 6-44050 discloses a connection structure between a first electronic instrument such as a cellular phone and a second electronic instrument corresponding to its cradle. Not limited to the cellular phone, but also in the field of digital still camera, the system in which a cradle is used to charge a battery of a digital camera or perform data communication with an external device such as a personal computer is known.

In many cases, the cradle for the digital camera is mainly used in the following two ways. The first one is, as shown in FIG. 9, to place a cradle 104 at a position near an external device such as a personal computer (PC) 100, for example, on a desk 102 for performing communication between the personal computer 100 and a camera 106 through the cradle 104. The second one is to use the camera 106 as a PC camera for image inputting while the camera 106 is being mounted on the cradle 104.

However, in any of the use patterns described above, the camera attitude depends on the main body of the cradle, and therefore, there is little flexibility in the camera angle, thus causing inconveniences.

SUMMARY OF THE INVENTION

The present invention has been developed in view of the above-described circumstances, and its object is to provide a cradle for a digital camera enabling to set up a camera with flexible attitude while the camera is being mounted on a cradle.

Furthermore, for example, since a camera having a shape which is longer than is wide has its center of gravity at a relatively high position, it is preferable to make the side and rear walls of the cradle higher for enhancing camera holding, which also serves to prevent the camera from dropping. In general, on the rear surface of the digital camera, a liquid-crystal display part capable of displaying images or characters, various switch buttons and the like are provided, and on the side surfaces of the camera, a medium slot into which a removable medium is inserted, an audio/video output terminal, a power supply terminal and a terminal of communication interface such as USB are provided.

In case of the above-described cradle having high walls, the liquid-crystal display part, various switch buttons, medium slot cover, terminal part and the like of the camera are covered with the walls, and accordingly, it is impossible to confirm the contents of the display such as images, insert or slide out the medium, and attach or detach a communication cable or the like.

The present invention has also been developed in view of the above-described circumstances, and its object is to provide a cradle for a digital camera enabling to confirm the display on the liquid-crystal display part, exchange recording media and plug in the communication cable or the like, as required, without deteriorating the camera holding while the camera is being mounted on the cradle.

To achieve the above-described object, a cradle for a digital camera according to the present invention has a tripod screw hole into which a fixing male screw used in a tripod for a camera can be screwed by being screwed in.

According to the present invention, since the tripod screw hole is provided in the cradle for the digital camera, the cradle can be fixed on the tripod while the digital camera is being inserted into the cradle. This makes it possible to freely set the direction or angle of the camera by using the platform of the tripod, thus increasing the flexibility in setting arrangement.

According to an aspect of the present invention, the cradle for a digital camera includes: a camera mounting part on which a digital camera is mounted; a first communication device which performs communication with the digital camera mounted on the camera mounting part; a second communication device which performs communication with an external device such as a personal computer; and a power supply terminal which supplies power to the digital camera mounted on the camera mounting part.

According to this aspect, long-duration photographing becomes possible by supplying power to the digital camera from the cradle through the power supply terminal. Image data photographed by the digital camera is transmitted to the cradle through the first communication device, and then transmitted from the cradle to the external device through the second communication device. As the first and second communication devices, it is preferable to apply a bi-directional communication interface such as USB and IEEE1394.

According to another aspect of the present invention, in the above-described cradle for a digital camera of the present invention, the height of leg parts provided on a bottom surface of the cradle is equal to or higher than that of a tripod base which serves as a tripod fixing surface. In the case where the cradle is placed on a flat surface such as a desk surface, the leg parts support the cradle and the tripod base is not in contact with the placing surface. Even if the tripod base contacts the placing surface, its height is equal to that of the leg parts, and therefore, good stability is obtained.

According to a further aspect of the present invention, the cradle includes: a locking device which fixes a digital camera to the cradle by a mechanical engaging device when the digital camera is mounted; and a releasing device which releases the fixing. According to this aspect, the digital camera is securely fixed on the cradle by the locking device, the digital camera does not drop even if the camera attitude (or photographing angle) is largely tilted by the tripod.

Also, to achieve the above-described object, in a cradle for a digital camera according to the present invention, a part of wall surface which holds a digital camera is movable.

For example, the wall surface covering at least one of a media insertion part, an image display part, a terminal part and a battery insertion part provided in the digital camera is constituted by a movable wall.

According to the present invention, in the cradle on which the camera is mounted, a part of the wall surfaces formed around the camera mounting part is constituted by a movable wall member (movable wall), and therefore, it becomes possible to mount or demount recording media, confirm the contents of display in the image display part, attach or detach a cable plug, change the battery or the like, while the camera is being inserted into the cradle.

As an aspect of the cradle of the present invention having the movable wall, it is preferred that, not to deteriorate the camera holding, the cradle has standing walls each of which holds two sides forming a corner of at least one pair of diagonal corner portions of a digital camera whose cross section has a generally rectangular shape.

According to an aspect of the present invention, the movable wall surface is constituted by a movable wall which is rotatably supported, and wherein an angle adjustment device which is capable of adjusting a stop angle of the movable wall is provided in the cradle, and the movable wall can also be used as a leg portion for supporting the cradle.

By supporting the movable wall with a structure capable of adjusting the angle such as a free stop type and a click stop type, the movable wall can be utilized as a simple tripod as required. This makes it possible to freely control the angle of the camera inserted into the cradle.

According to another aspect of the present invention, the wall surface portion of the cradle which covers an image display part provided in the digital camera is constituted by a rotatable movable wall, and a mirror is formed inside of the movable wall which faces a display screen of the image display part. There is a possibility of occurrence of the case where the space behind the cradle is narrow and the display screen of the image display part on the rear surface of the camera cannot be confirmed depending upon the setting environment of the cradle. In the present invention, by constituting the wall surface of the cradle corresponding to the image display part of the digital camera by a movable wall and providing a mirror on the inside (the side facing the image display part) of the movable wall, the display screen can be confirmed by adjusting the mirror at an appropriate angle.

According to a further aspect of the present invention, the cradle for a digital camera includes: a camera mounting part on which a digital camera is mounted; a first communication device which performs communication with the digital camera mounted on the camera mounting part; a second communication device which performs communication with an external device such as a personal computer; and a power supply terminal which supplies power to the digital camera mounted on the camera mounting part.

According to this aspect, long-duration photographing becomes possible by supplying power to the digital camera from the cradle through the power supply terminal. Image data photographed by the digital camera is transmitted to the cradle through the first communication device, and then transmitted from the cradle to the external device through the second communication device. As the first and second communication devices, it is preferable to apply a bi-directional communication interface such as USB and IEEE1394.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereinunder a preferred embodiment of a cradle for a digital camera according to the present invention will be described in accordance with the accompanying drawings.

Figure 1:
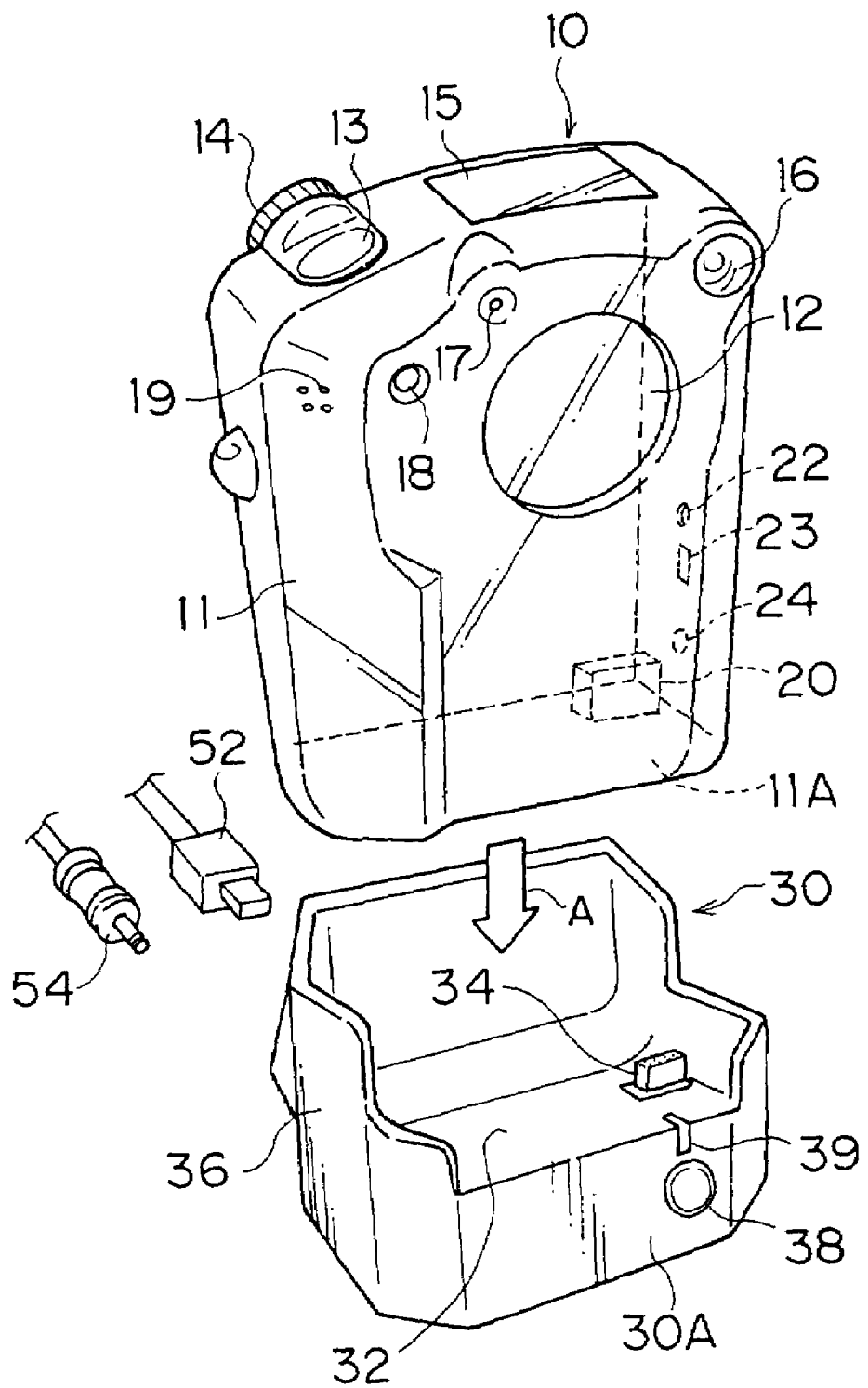
FIG. 1 is a perspective view showing a cradle for a digital camera and the digital camera according to an embodiment of the present invention.
Figure 2:
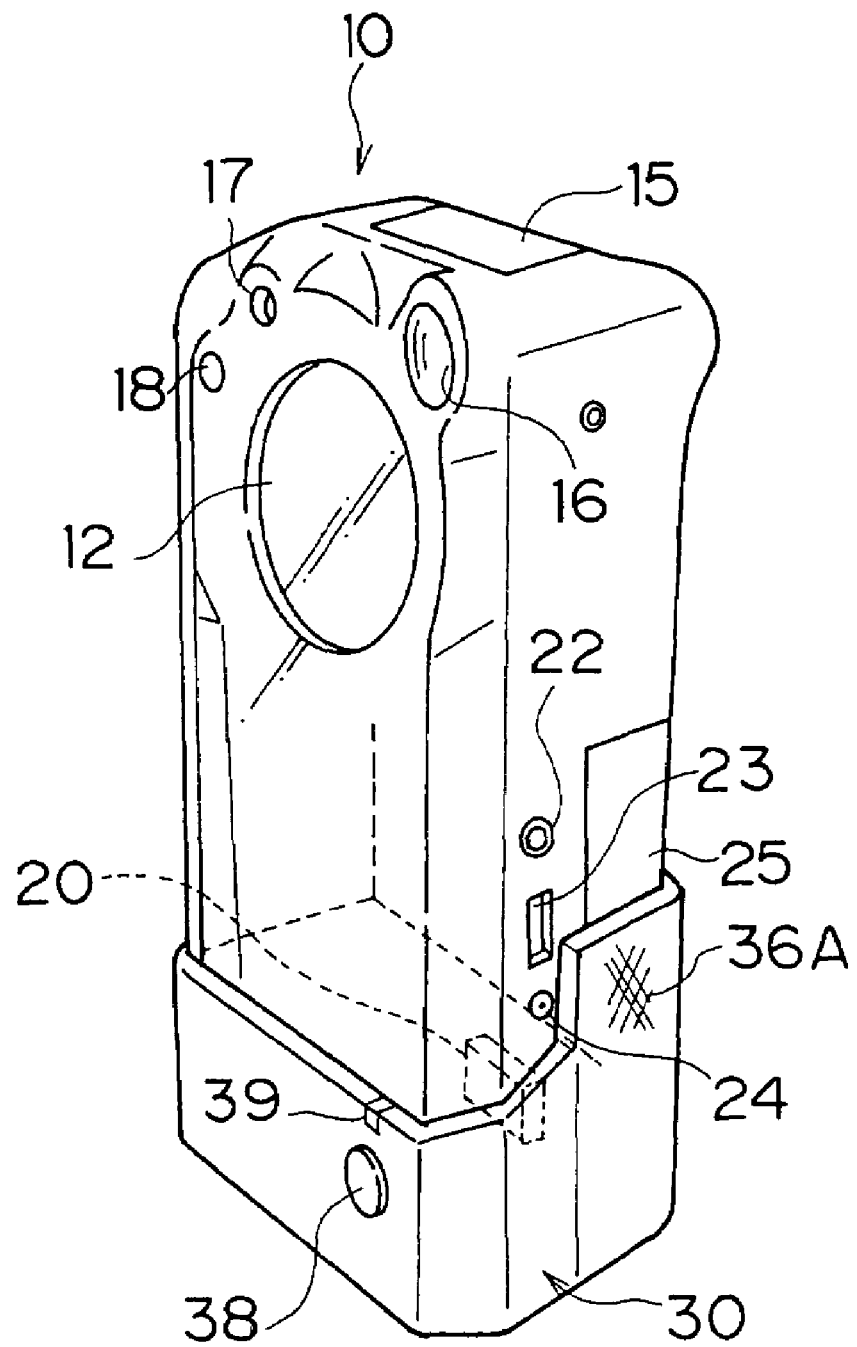
FIG. 2 is a perspective view showing a state where the camera is mounted on the cradle.

FIG. 1 is a perspective view showing a cradle for a digital camera and a digital camera before mounting according to an embodiment of the present invention, and FIG. 2 is a perspective view showing a state where the camera is mounted on the cradle. A camera 10 shown in these figures is a digital camera that is equipped with an image pickup element such as CCD, and is capable of converting an optical image of a subject into electronic image data and recording it onto a recording medium, which has a function of recording/reproducing a still image and sound-accompanying moving image. The recording medium may be a removable medium or a memory incorporated in the main body of the camera (internal memory).

In FIG. 1, the reference numeral 11 depicts a casing, 12 depicts a lens barrier, 13 depicts a shutter button, 14 depicts a mode dial, 15 depicts a pop-up flash, 16 depicts a finder window, 17 depicts a self-timer lamp, 18 depicts a flash adjustment sensor and 19 depicts a microphone. On a bottom surface 11A of the casing 11 of the camera 10, a connector 20 (hereinafter, referred to as a camera connector) for electrically connecting with a cradle 30 is provided.

On the upper part of the cradle 30, a camera mounting part 32 (hereinafter, referred to as a mounting part) for placing the camera 10 is formed, and on a bottom part of the mounting part 32, a connector 34 (hereinafter, referred to as a cradle connector) for electrically connecting with the camera 10 is provided. Around the mounting part 32, a wall part 36 standing upward is formed, whose inner periphery is substantially the same shape as an outer periphery of a lower part of the casing 11 of the camera 10.

Along the direction of an arrow A from above in FIG. 1, the camera 10 is inserted into the mounting part 32 of the cradle 30, and then the camera connector 20 is connected to the cradle connector 34 in conjunction with the insertion operation, whereby both of them are electrically connected and the lower part of the camera 10 is held by the wall part 36. As shown in FIG. 2, to expose an audio/video output (A/V output) terminal 22, digital (USB) terminal 23 and power supply input terminal 24 provided on the side surface of the camera 10, the corresponding portion of the wall part 36 of the cradle are cut away. However, to enhance the holding for the camera 10, wall height of the portion (indicated by the reference numeral 36A in FIG. 2) that support the rear part of the camera 10 is made to be relatively high.

In FIG. 2, the reference numeral 25 depicts a cover (slot cover) of a media slot for inserting a memory card as a recording medium. In the state where the camera 10 is mounted on the cradle 30, a part of the slot cover 25 is covered with the wall part 36, and therefore, it is impossible to open the slot cover 25.

As the communication interface between the camera 10 and the cradle 30, various types of interfaces such as a serial interface, for example, USB, IrDA, IEEE1394 or the like, and a parallel interface are applicable. In this embodiment, it is supposed that the USB interface is applied. Each of the camera connector 20 and cradle connector 34 shown in FIG. 1 is constituted by a complex terminal in which a USB terminal, power supply terminal and any other signal communication terminals, as required, are united in a single connector.

Not shown in FIG. 1, though, the USB terminal (indicated by the reference numeral 46 in FIG. 3) and the power supply terminal (indicated by the reference numeral 48 in FIG. 3) are provided on the rear surface of the cradle 30. A USB cord 52 is connected to the USB terminal 46 and a power supply cord 54 from an AC power adapter (not shown in figures) is connected to the power supply terminal 48. By connecting the cradle 30 and an external device (not shown in FIG. 1) such as a personal computer via the USB cord 52, it becomes possible to perform bi-directional communication between the camera 10 and the external device.

In case of USB connection, the camera 10 has the following communication operation modes: a card reader function (storage mode) for reading or writing the recording medium in the camera 10 from a personal computer (external device); and an image input device function (PC camera mode) for performing photographing in the state where the camera 10 is connected to a personal computer, and transmitting the photographed image to the personal computer. The camera 10 has a configuration such that the operation mode in the USB connection can be selectively switched by using a menu screen or the like.

The camera 10 is equipped with a rechargeable battery not shown in the figures, and accordingly, it is possible to charge the battery by setting the camera 10 to the cradle 30. Not limited to charging the battery as described above, the power provided from an external power supply connected via the power supply cord 54 is available as a power supply of the camera 10.

As shown in FIG. 1, a power switch 38 is provided on a front surface 30A of the cradle 30. By pressing operation on the power switch 38, the power supply of the cradle 30 is made to be ON/OFF. Above the power switch 38, a display part 39 composed of a light-emitting diode (LED) is provided to indicate the operation status of the cradle 30 by combination of illumination status and illumination color of the display part 39.

Figure 3:
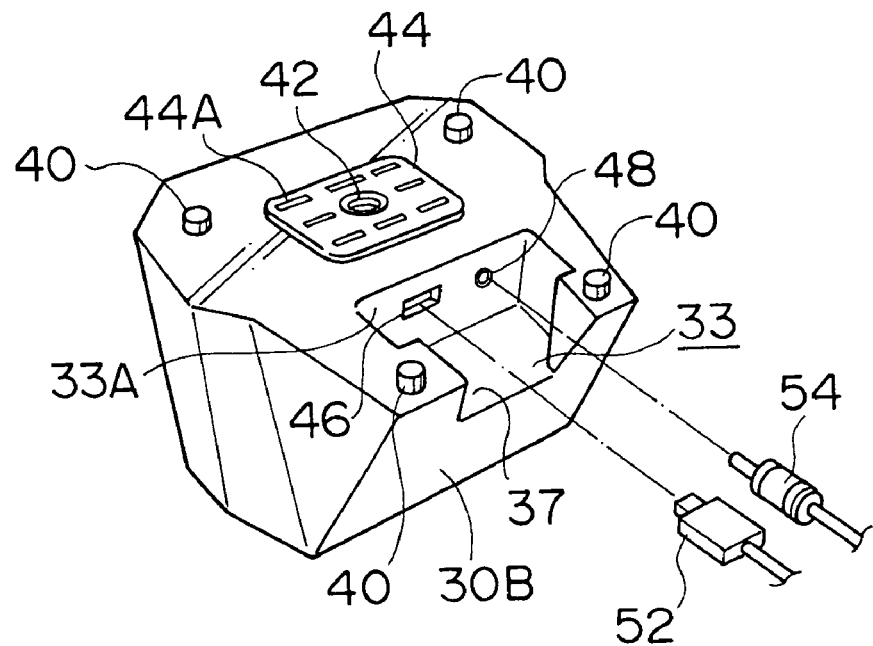
FIG. 3 is a perspective view showing a bottom surface of the cradle.

FIG. 3 is a perspective view showing a bottom surface of the cradle 30. As shown in the figure, on each of four corners of the bottom surface of the cradle 30 a rubber pad 40 is provided, and on an approximate center portion of the bottom surface a screw hole 42 for fixing the tripod (hereinafter, referred to as a tripod screw hole) and tripod base 44 are provided. Various shapes of the tripod screw hole may be available, but the commonly used screw hole of ¼ inch (JIS-standard size) is preferred. The tripod base 44 serves as a mounting surface in mounting the cradle 30 on a platform (see the reference numeral 62 in FIG. 4) at an upper portion of the tripod. As shown in FIG. 3, the tripod screw hole 42 is formed at an approximate center of the tripod base 44 and on the surface of the base, non-slip projections and depressions 44A are provided. Since an aspect may be possible wherein a pin for stopping rotation (or for positioning) is provided on the platform 62, a corresponding aspect may also be available wherein a hole with which the pin is engaged is formed on the tripod base.

As shown in FIG. 3, on the rear side of the bottom portion of the cradle 30, a deep depression part 33 capable of accommodating connector parts of the USB cord 52 and the power supply cord 54 is formed, and on a rear surface 30B of the cradle 30, a cut-away part 37 corresponding to the depression part 33 is formed. On a vertical wall part 33A of the depression part 33, which faces the cut-away part 37, the USB terminal 46 and the power supply terminal 48 are provided. If the cradle 30 is placed on a flat surface such as a desk surface while the USB cord 52 and the power supply cord 54 are connected to the USB terminal 46 and the power supply terminal 48, respectively, the connector parts of the cords 52 and 54 are accommodated in the depression part 33, and therefore, the cradle 30 can be placed with stability, not being isolated from the surface due to the cords 52 and 54.

Next, the operation of the cradle 30 with the above-described configuration will be described.

Figure 4:
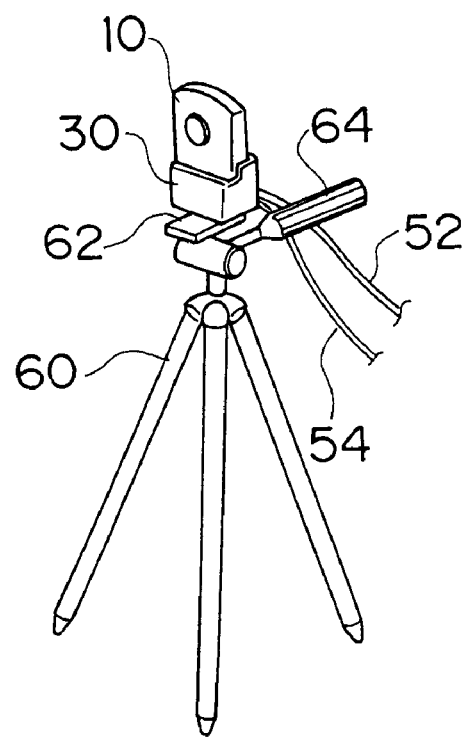
FIG. 4 is a perspective view showing a state where the camera is fixed to a tripod by using the cradle.

FIG. 4 is a perspective view showing the state where the camera 10 is mounted on the tripod 60 by using the cradle 30 of this embodiment. On the upper part of the tripod 60 for the camera, the platform 62 is provided, on which the cradle 30 is placed and an male screw for fixing (not shown in FIG. 4, but indicated as the reference numeral 66 in FIG. 7) is screwed from beneath the platform 62 to engage with the tripod screw hole 42 shown in FIG. 3, thereby fixing the cradle 30.

By adjusting the leg length of the tripod 30 or operating an operation bar 64 as appropriate, the direction and/or angle of the camera 10 can be controlled at will. Also, it becomes possible to perform long-duration intermittent photographing and long-duration moving image photographing by supplying power to the camera 10 from the cradle 30. Image data photographed by the camera 10 can be transmitted to an external device such as a personal computer via the USB cord 52.

Figure 5:
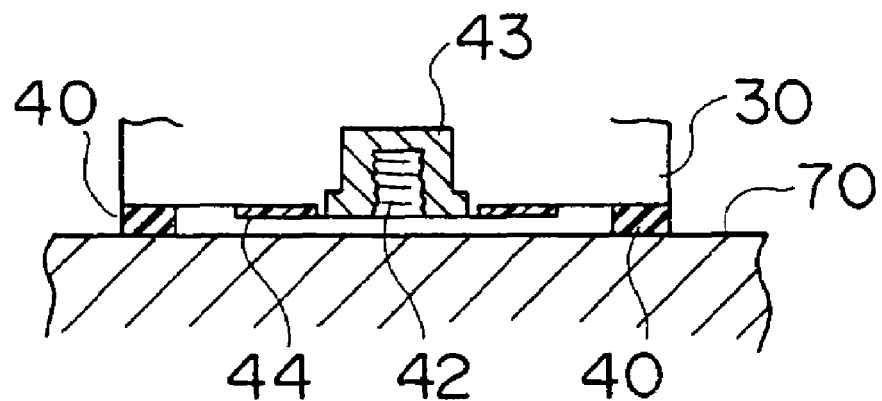
FIG. 5 is a cross section of a main part that shows a relation between rubber pads provided on the bottom surface of the cradle and a tripod base.

FIG. 5 is a cross section of a main part showing the relation between the rubber pads 40 and the tripod base 44. As shown in the figure, in the cradle 30 of this embodiment, the height of the tripod base 44 is lower than that of the rubber pads 40. Therefore, when the cradle 30 is placed on a flat surface such as a surface of desk 70, the cradle 30 is supported by the rubber pads 40, thus making the tripod base 44 and an female screw member 43 (the member to be the tripod screw hole 42) for the tripod do not contact the desk surface, whereby the cradle 30 can be stable.

Figure 6:
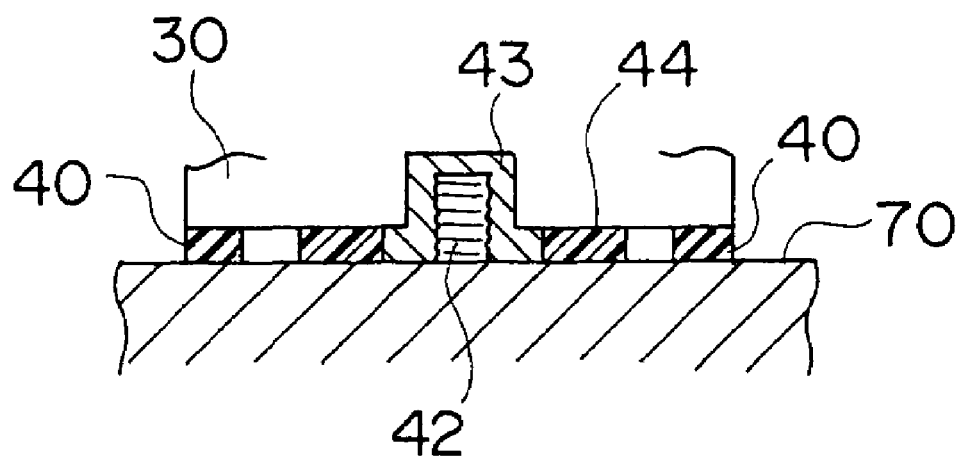
FIG. 6 is a cross section of a main part that shows another relation between the rubber pads provided on the bottom surface of the cradle and the tripod base.

As shown in FIG. 6, the tripod base 44 has substantially the same height as the rubber pads 40 at the maximum. Given that the tripod base 44 is higher than the rubber pads 40, the rubber pads 40 do not contact the desk surface. Therefore, the stability is deteriorated, which is undesirable.

Figure 7:
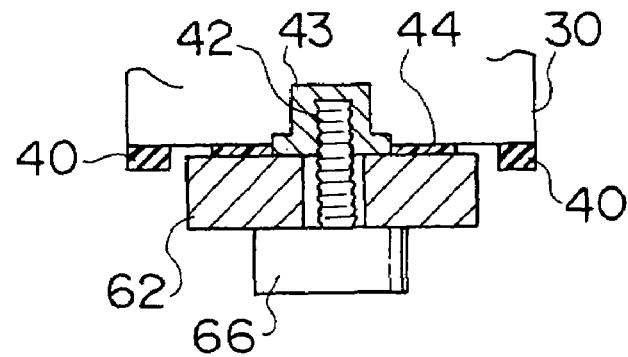
FIG. 7 is a cross section of a main part that shows a state where the cradle is fixed on a platform of the tripod.

FIG. 7 is a cross section of a main part showing a state where the cradle 30 is fixed to the platform 62. As shown in the figure, when the cradle 30 is placed on the platform 62, the rubber pads 40 are not in contact with the platform 62. Since the size of the platform 62 is roughly fixed, it is desirable to design the positional relation between the rubber pads 40 and the tripod base 44 so that the rubber pads 40 and the platform 62 are not in contact with each other when the cradle 30 is fixed on the platform 62 in consideration of the size of typical platforms currently on the market. Accordingly, the tripod base 44 is brought into intimate contact with the platform 62. The tripod male screw 66 is screwed in the tripod screw hole 42 and engaged therewith, thus fixing the cradle 30 with stability.

Figure 8:
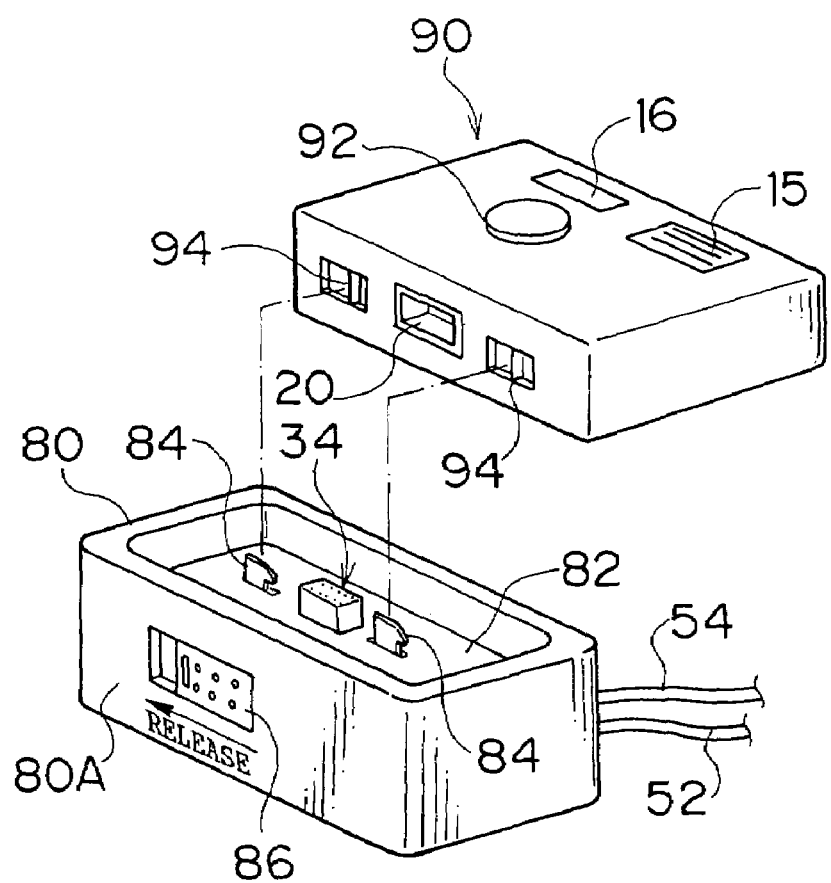
FIG. 8 is a perspective view showing another embodiment of the present invention.
Figure 9:
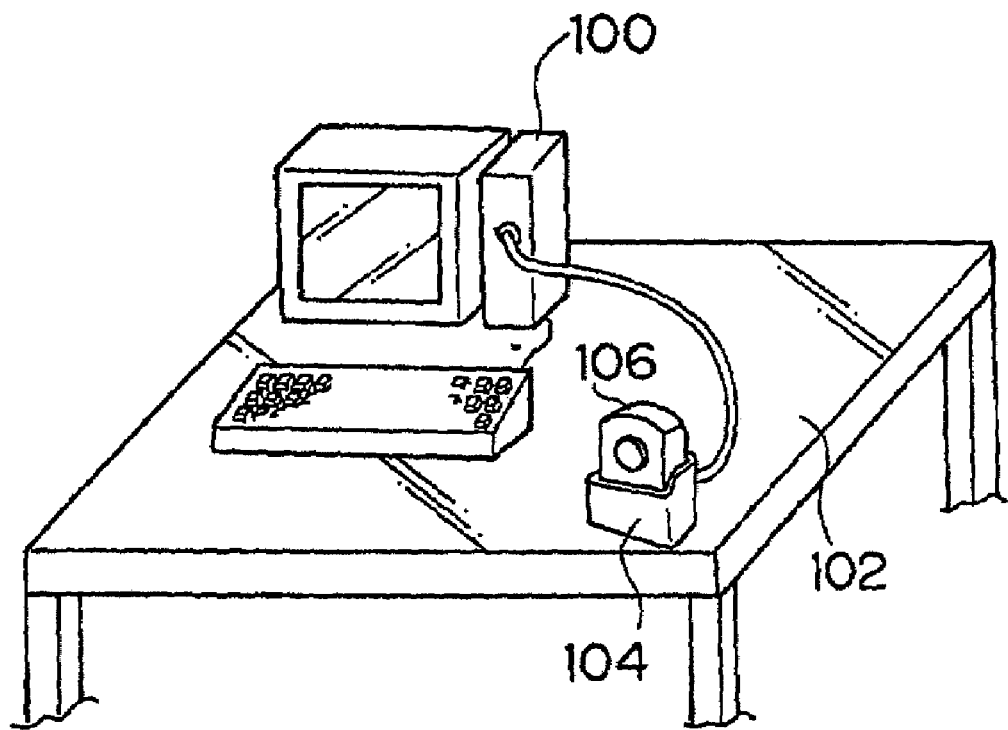
FIG. 9 is a perspective view showing an example of a use pattern of a conventional cradle for a digital camera.

FIG. 8 is a perspective view showing another embodiment of the present invention. In FIG. 8, same or similar parts as those of FIG. 1 are assigned the same reference numerals, and explanation thereof will be omitted.

On the top surface of a cradle 80 shown in FIG. 8, a depression part 82 is formed as a camera mounting part. On the bottom surface of the depression part 82, a cradle connector 34 for electrically connecting with a camera 90 and hooks 84 for connecting and fixing (locking) the camera 90 are provided.

The camera 90 is a digital camera capable of converting an optical image of a subject entering through a photographing lens 92 into an electrical signal by an image pickup element such as a CCD, and recording electronic image data having been obtained onto a recording medium. On the bottom surface of the camera 90, a camera connector 20 and engaging parts (hooking parts) 94 for engaging with the hooks 84 of the cradle 80 are formed.

When the camera 90 is inserted into the depression part 82 of the cradle 80, the camera connector 20 is connected with the cradle connector 34 and the hooks 84 of the cradle 80 are engaged with the engaging parts 94 of the camera 90, whereby the camera 90 is fixed on the cradle 80.

Not shown in FIG. 8, though, the rubber pads 40, tripod base 44 and tripod screw hole 42 are provided on the underside of the cradle 80 as in the case of FIG. 3, thus capable of mounting the cradle 80 on the tripod 60. Because the camera 90 is securely fixed on the cradle 80 by a mechanical locking system in which the hooks 84 of the cradle 80 are engaged with the engaging parts 94 of the main body of the camera, the camera 90 does not drop even if the attitude of the camera 90 is largely tilted by the tripod 60.

As shown in FIG. 8, by performing an operation of sliding a lock release button 86 provided on the front surface 80A of the cradle 80 to the left direction in FIG. 8, the hooks 84 are moved to a lock releasing direction (left direction in FIG. 8) in conjunction with the operation, thereby releasing the engaged state (releasing the lock). Since it is possible to operate the lock release button 86 in the state where the cradle 80 is fixed to the tripod, the user can separate the camera 90 from the cradle 80 as required.

Next, a further embodiment of the present invention will be described.

Figure 10:
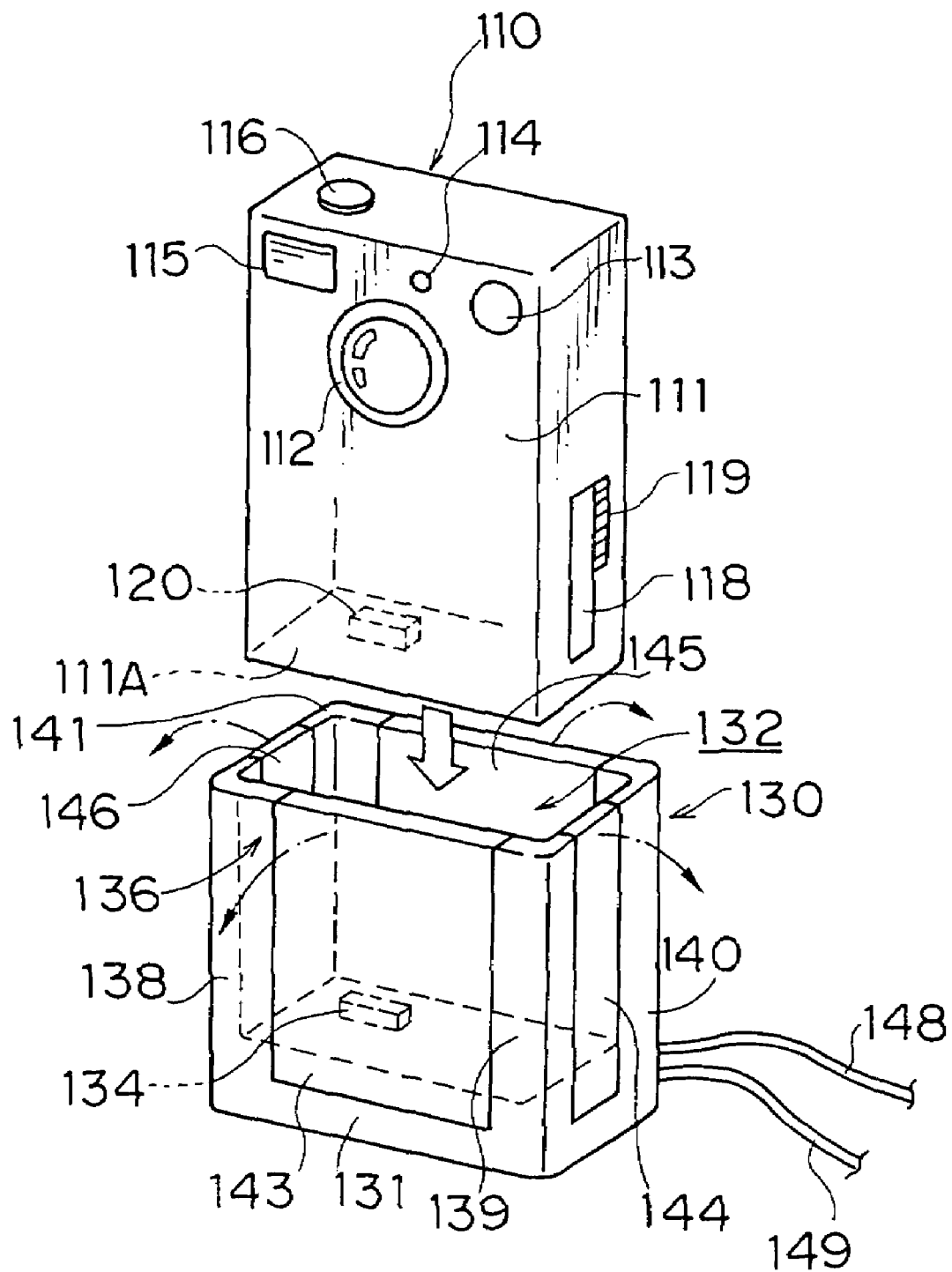
FIG. 10 is a perspective view showing a cradle for a digital camera and the digital camera according to another embodiment of the present invention.

FIG. 10 is a perspective view showing a cradle for a digital camera and the digital camera according to this embodiment of the present invention. A camera 110 is a digital camera capable of converting an optical image of a subject entering through a photographing lens 112 into an electrical signal by an image pickup element such as a CCD, and recording electronic image data having been obtained onto a recording medium. In this embodiment, a memory card called as Smart Media (Solid-State Floppy Disk Card) is used as the recording medium. However, kind of the recording medium is not limited thereto, and any other recording medium such as Compact Flash can be applied.

As shown in FIG. 10, the camera 110 has a generally rectangular parallelepiped-shape which is longer than is wide, and on the front surface of a casing 111, the photographing lens 112, a finder window 113, self-timer lamp 114 and a flash part 115 are provided. A shutter button 116 is provided on a top surface, and a slot cover 118 is provided on a side surface of the camera. The slot cover 118 is a door for protecting a media slot (not shown in FIG. 10, but indicated as the reference numeral 171 in FIG. 14), which is mounted to be opened/closed by a hinge mechanism not shown in the figure. The slot cover 118 is locked by a lock mechanism not shown in the figure when it is closed. By operating a lock release knob 119 in a downward direction in FIG. 10, latch of the lock mechanism (not shown in the figure) of the slot cover 118 becomes off and the slot cover 118 is opened.

On an underside 111A of the casing 111 of the camera 110, a connector (hereinafter, referred to as a camera connector) 120 for electrically connecting with a cradle 130 is provided.

The cradle 130 has a box shape with a bottom, and its top is opened. On a bottom part of a camera mounting part (hereinafter, referred to as a mounting part) 132 to place the camera 110, a connector (hereinafter, referred to as a cradle connector) 134 for electrically connecting with the camera 110 is provided. At the outer periphery part of the mounting part 132, a wall 136 which stands upwardly is formed, and an inner peripheral shape of the wall 136 generally matches the outer peripheral shape of the lower part of the casing 111 of the camera 110.

By inserting the camera 110 into the cradle 130 along the direction indicated by an allow A from above in FIG. 10, in conjunction with the insertion operation, the camera connector 120 is connected with the cradle connector 134, whereby both of the camera 110 and the cradle 130 are electrically connected, and the lower part of the camera 110 is held by the wall 136.

The wall 136 is composed of column parts 138, 139, 140 and 141 integrally formed with a main body 131 of the cradle 130 and movable walls 143, 144, 145 and 146. The column parts 138, 139, 140 and 141 are wall members fixed to (do not move) the four corners of the cradle and standing upwardly, whose cross sections have generally an L-shape. The shape of the cross sections of the column parts 138, 139, 140 and 141 is designed to correspond to an external shape of the casing 111 so that the four corners of the camera 110 (ridge lines in a longitudinal direction and the corner parts which are proximate to the ridge lines) are held by the column parts 138, 139, 140 and 141 when the camera 110 is inserted into the cradle 130. The camera 110 having a shape which is longer than is wide has its center of gravity at a relatively high position, the wall 136 is formed to be relatively high corresponding thereto.

The movable walls 143, 144, 145 and 146 are supported around axes near the base portions between adjacent two column parts (138, 139), (139, 140), (140, 141) and (141, 138), respectively, and the movable walls 143, 144, 145 and 146 have structures such that the upper side of each wall is, as indicated by an allow of the dashed line, movable toward the outside of the cradle 130. The support structures of the movable walls 143, 144, 145 and 146 will be described later with reference to FIGS. 11 and 12.

As the communication interface between the camera 110 and the cradle 130 shown in FIG. 10, various types of interfaces such as a serial interface, for example, USB, IrDA, IEEE1394 or the like, and a parallel interface are applicable. In this embodiment, it is supposed that the USB interface is applied. Each of the camera connector 120 and cradle connector 134 shown in FIG. 10 is constituted by a complex terminal in which a USB terminal, power supply terminal and any other signal communication terminals, as required, are united in a single connector.

Not shown in FIG. 10, though, the USB terminal (indicated by the reference numeral 185 in FIG. 15) and the power supply terminal (indicated by the reference numeral 186 in FIG. 15) are provided on the rear surface of the cradle 130. A USB cord 148 is connected to the USB terminal 185 and a power supply cord 149 from an AC power adapter (not shown in the figures) is connected to the power supply terminal 186. By connecting the cradle 130 and an external device (not shown in FIG. 10) such as a personal computer via the USB cord 148, it becomes possible to perform bi-directional communication between the camera 110 and the external device.

In case of USB connection, the camera 110 has the following communication operation modes: a card reader function (storage mode) for reading or writing to the recording medium of the camera 110 from a personal computer (external device); and an image input device function (PC camera mode) for performing photographing in the state of connecting the camera 110 to a personal computer and transmitting the photographed image to the personal computer. The camera 110 has a configuration such that the operation mode in the USB connection can be selectively switched by using a menu screen or the like.

The camera 110 is equipped with a rechargeable battery not shown in the figures, and accordingly, it is possible to charge the battery by setting the camera 110 to the cradle 130. Not limited to charging the battery as described above, the power provided from an external power supply connected via the power supply cord 149 is available as a power supply of the camera 110.

Figure 11:
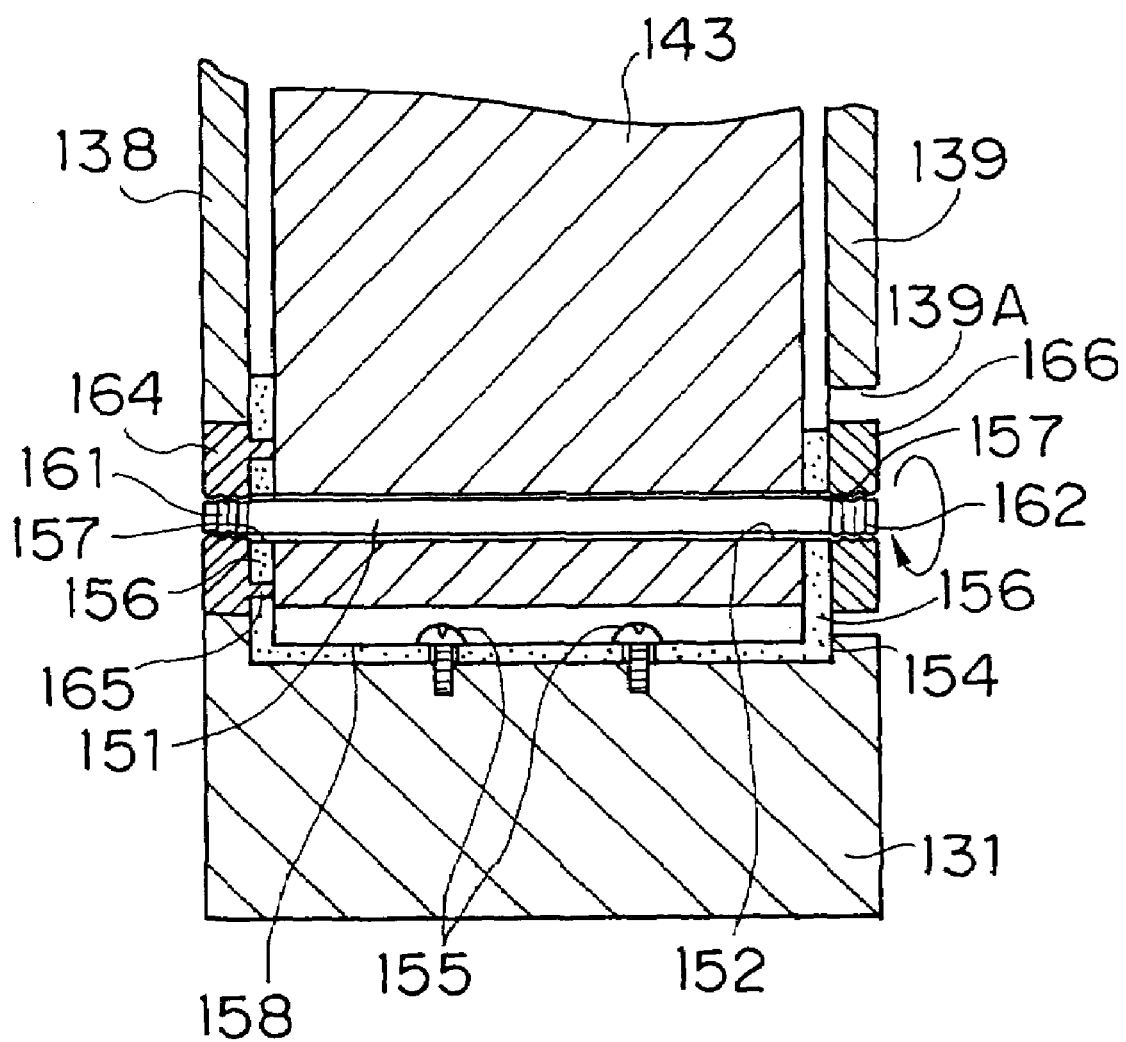
FIG. 11 is a cross section of a main part that shows an example of a support structure for movable walls of the cradle.

FIG. 11 is a cross section of a main part showing an example of the support structure (free stop structure) of the movable wall. With reference to the figure, only the movable wall 143 will be described, but the same structure is applied to any other movable walls 144, 145 and 146. As shown in FIG. 11, a through hole 152 is formed at the lower part of the movable wall 143, through which a shaft 151 passes to serve as an axis of rotation. Between the movable wall 143 and the main body 131 of the cradle 130, a friction metal sheet 154 is provided. The cross section of the friction metal sheet 154 has a U-shape (a shape of topless box), and a passing hole 157 through which the shaft 151 passes is formed at a narrow parts 156 that stand along the column parts 138 and 139. A connection part 158 for connecting the narrow parts 156 of right and left sides is fixed to the bottom part of the cradle main body 131 with screws 155.

The positions of the passing hole 157 of the friction metal sheet 154 and the through hole 152 of the movable wall 143 are aligned, and the shaft 151 is passed through the holes. Male screws 161 and 162 are formed at both ends of the shaft 151, and the male screw 161 at one end (left end in FIG. 11) is screwed in to engage with a nut 164 provided in the column part 138 of the cradle main body 131. The nut 164 has a rotation stop 165 which engages with the friction metal sheet 154.

The male screw 162 at the other end (right end in FIG. 11) of the shaft 151 is screwed to be engaged with a tightening adjustment nut 166. At a part of the column part 139, an opening 139A is formed so that the tightness of the nut 166 can be adjusted. According to this structure, the tightness of the nut 166 can be adjusted, whereby appropriate friction capable of stopping the movable wall 143 at an arbitrary angle is obtained.

Figure 12:
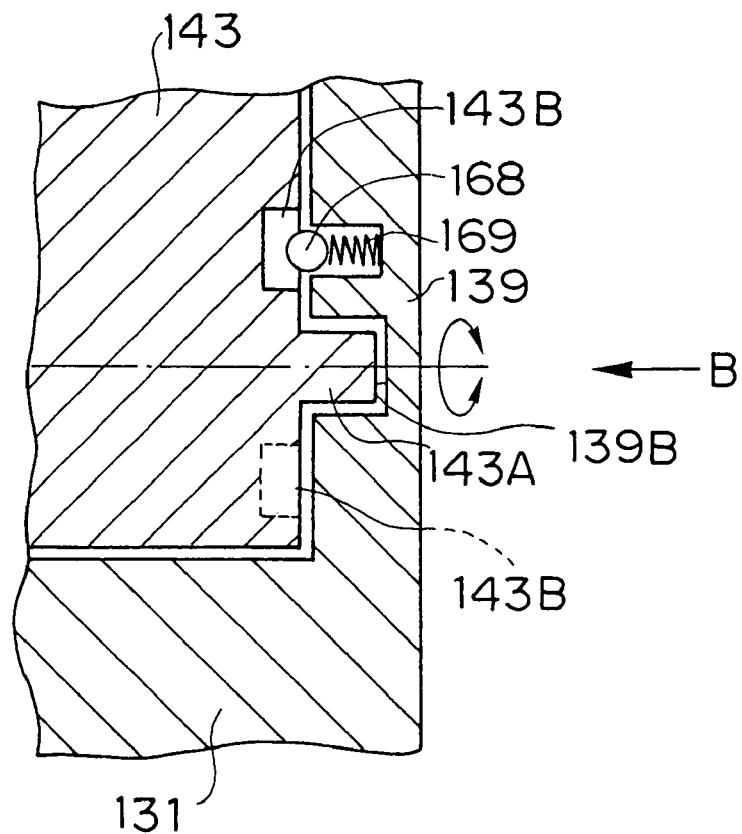
FIG. 12 is a cross section of a main part that shows another support structure for the movable walls.
Figure 13:
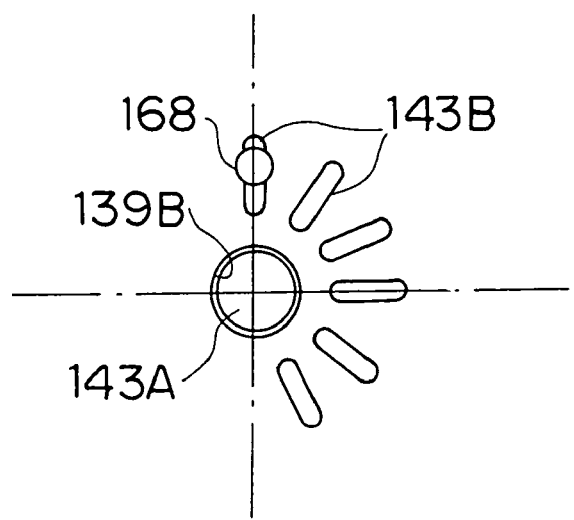
FIG. 13 is a perspective view showing the support structure that is viewed from the direction indicated by an arrow B in FIG. 12.

FIG. 12 is a cross section of a main part showing another example (click stop structure) related to the support structure of the movable wall, and FIG. 13 is a perspective view showing the example viewed from the direction indicated by an allow B in FIG. 12.

As shown in these figures, a projecting part (hereinafter, referred to as an axis part) 143A of a cylindrical shape, which serves as an axis of rotation is provided to the movable wall 143, and plural click holes 143B are formed on the same circumferential line around the axis part 143A. On the column part 139 of the cradle main body 131, a depression part 139B is formed to serve as a bearing with which the axis part 143A of the movable wall 143 is engaged. The axis part 143A of the movable wall 143 is inserted into the depression part 139B, and accordingly, the movable wall 143 is rotatably supported.

On the column part 139, a click ball 168 for engaging with one of the click holes 143B is provided, and a spring 169 applies a force to the click ball 168 toward the movable wall (the left direction in FIG. 12). By tilting the movable wall 143, a position of the click hole 143B with which the click ball 168 is engaged is changed, and the stop angle of the movable wall 143 is controlled in accordance with the position of the click hole 143B.

Figure 14:
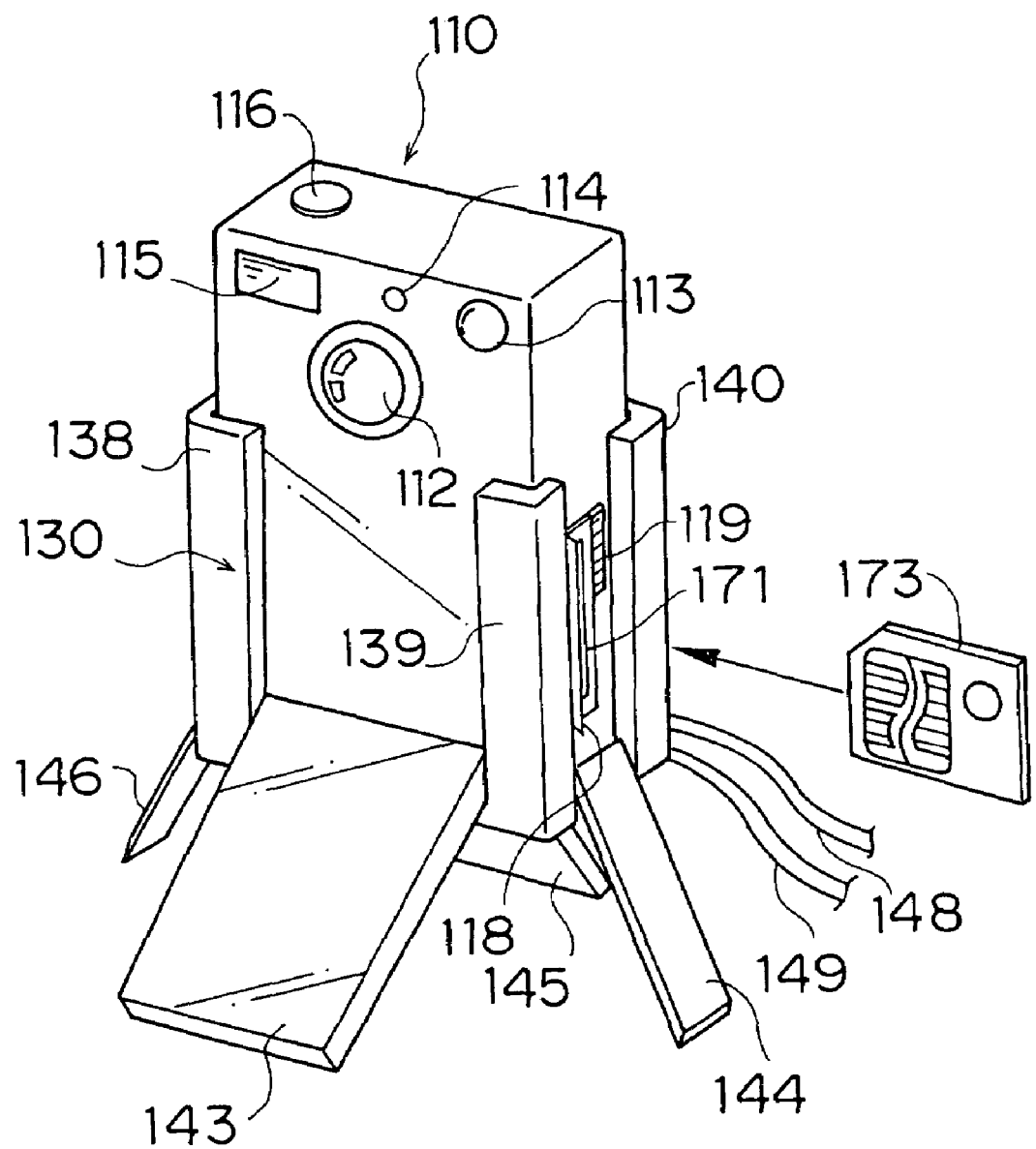
FIG. 14 is a perspective view showing a use pattern of the cradle.

Next, the operation of the cradle 130 with the above-described configuration will be explained. FIG. 14 is a perspective view showing an example of a use pattern of the cradle 130. As shown in the figure, by tilting the movable walls 143, 144, 145 and 146 of the cradle 130, the movable walls 143, 144, 145 and 146 function as leg parts for supporting the cradle 130. As explained with reference to FIGS. 12 and 13, each of the movable walls 143, 144, 145 and 146 has the structure that it can be stopped at a free angle (arbitrary angle or any of plural positions) in tilting, and therefore, the camera 110 can be controlled at a desired angle when the cradle 130 is placed on a desk or the like.

By opening the movable wall 144 on the side surface of the cradle, the front surface of the slot cover 118 is opened up, thus making it possible to open or close the slot cover 118 in the state where the camera 110 is inserted into the cradle 130. A memory card 173 can be inserted or slid out by opening the slot cover 118 and exposing the media slot 171. If the slot cover 118 is opened during power-on condition, control is executed to automatically turn the power off for protecting the medium.

Not show in the figures, though, on the side surface of the camera opposed to the side of the media slot 171, terminals such as an audio/video output (A/V output) terminal, digital (USB) terminal and power supply input terminal are provided, and the cradle 130 has a structure that these terminals are laid opened by tilting the movable wall 146 that covers the relevant side surface of the camera. Accordingly, a plug of a cable that is not shown in the figures can be connected with the terminal in the state where the camera 110 is inserted into the cradle 130.

Figure 15:
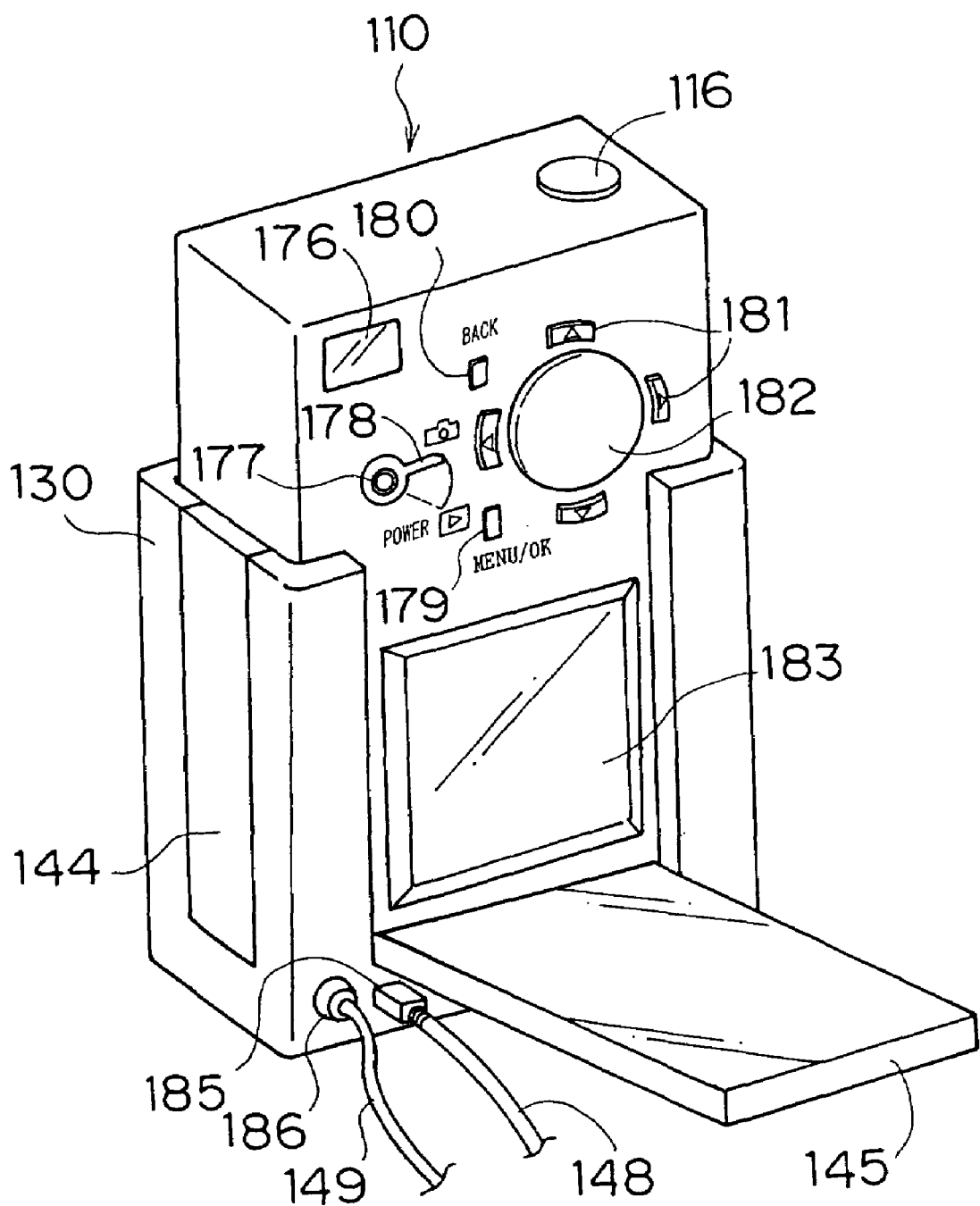
FIG. 15 is a rear-side perspective view showing another use pattern of the cradle.

FIG. 15 is a perspective view showing another use pattern of the cradle 130 viewed from the side of the rear surface. As shown in the figure, on the rear surface of the camera, a finder 176, a power supply button 177, a mode lever 178, a menu/OK button 179, a BACK button 180, a cross button 181, a display panel 182 and a liquid-crystal monitor 183 are provided. The mode lever 178 is an operation device for switching between the photographing mode and the reproducing mode.

The menu/OK button 179 is used for transferring from a normal screen of each mode to a menu screen, or performing determination of the selected contents, provision of instruction of executing (confirming) a process, or the like. The BACK button 180 is used for canceling an item selected from the menu, returning to the preceding operation or the like.

The cross button 181 is a multi-function operation part capable of inputting instructions in the four directions right, left, upward and downward. In the reproducing mode, the left key and the right key function as one-frame backward button and one-frame forward button, respectively. The upward key and the downward key are used as a zoom key for magnification adjustment in a reproduction zoom function or an electronic zoom function in a photographing process. The cross button 181 also functions as an operation button for selecting a menu item from the menu screen displayed by pressing the menu/OK button 179 or instructing the selection of the various setting items in each menu. On a display panel 182, icons indicating the operation mode of the camera 110 or functions of the cross button 181 are displayed in accordance with the operation status.

The liquid-crystal monitor 183 can be used as an electronic finder for confirming an angle of view in photographing, and is capable of displaying a preview of photographed images or the reproduced images read from the memory card 173 loaded into the camera 110. The selection of the menu using the cross button 181 or setting of various setting items in each menu is also performed by using the display screen of the liquid-crystal monitor 183. Moreover, information such as the number of frames that can be photographed (as to the moving image, length of time that can be used for photographing), a reproduced frame number, macro mode, recording image quality and the number of pixels, is also displayed on the liquid-crystal monitor 183.

In the state where the movable wall 145 stands at the rear surface of the cradle 130, the liquid-crystal monitor 183 is covered with the movable wall 145, but if the movable wall 145 is tilted as shown in FIG. 15, the liquid-crystal monitor 183 is exposed. Accordingly, by tilting the movable wall 145 at the rear surface of the cradle 130 as required, the screen of the liquid-crystal monitor 183 can be observed.

Figure 16:
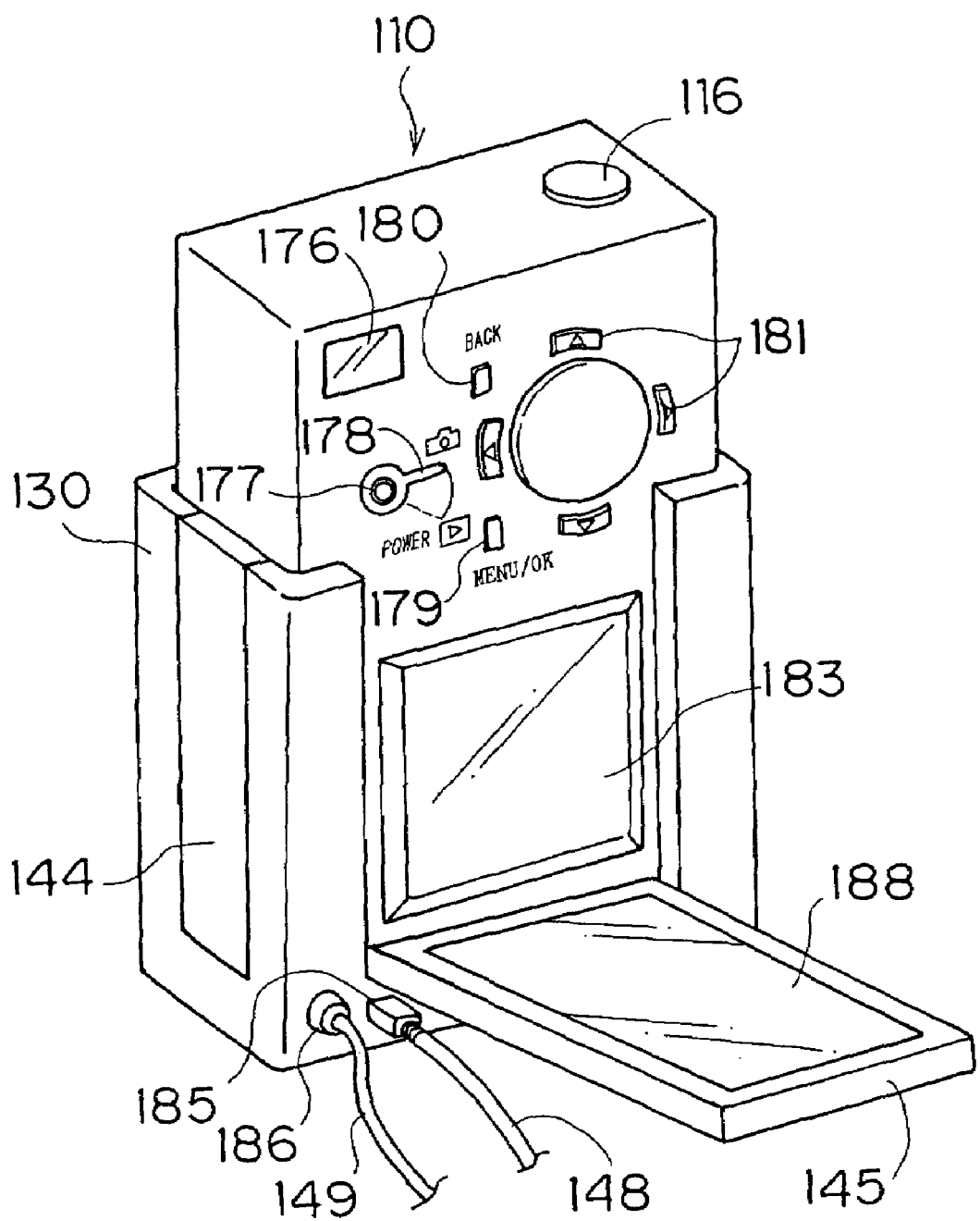
FIG. 16 is a rear-side perspective view showing a cradle according to another embodiment of the present invention.
Figure 17:
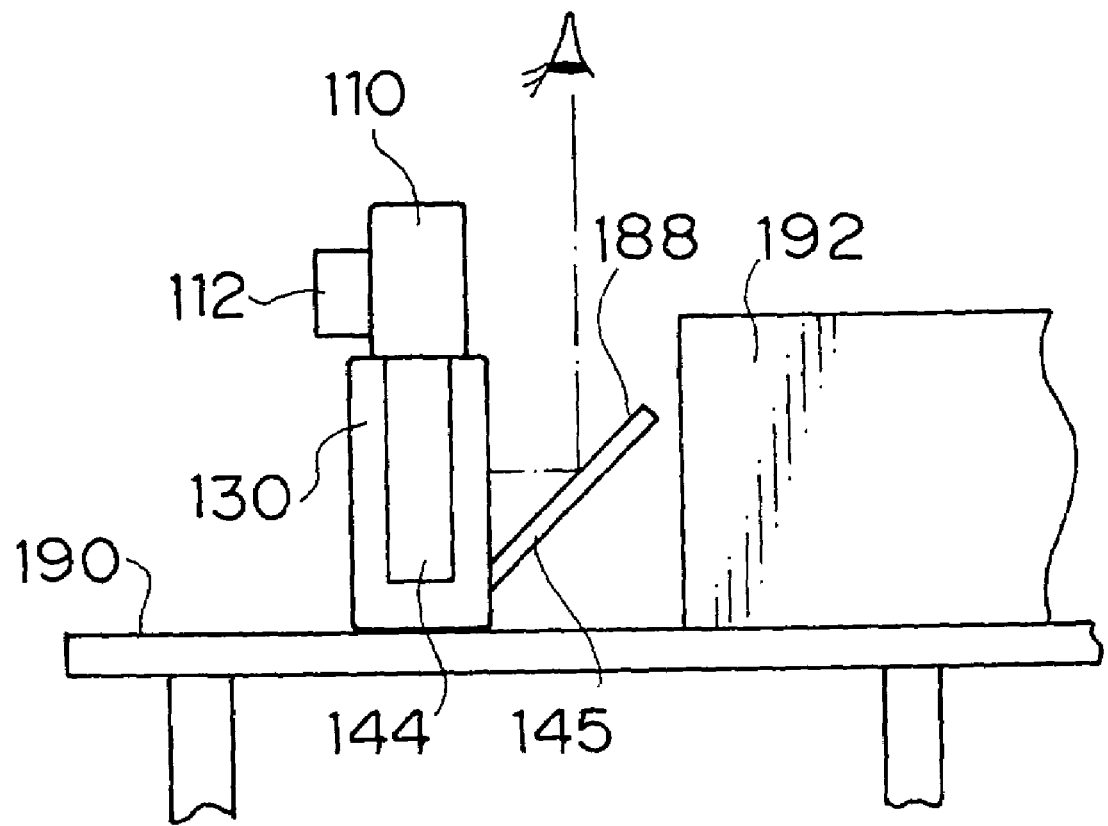
FIG. 17 shows a use pattern of the cradle shown in FIG. 16.

As a modification of the above-described use pattern, as shown in FIG. 16, a mirror 188 can be provided on the inside of the movable wall 145 (on the side facing the liquid-crystal monitor 183) at the rear surface of the cradle 130. According to the use pattern, for example, as shown in FIG. 17, even if an obstacle 192 exists just behind the location where the cradle 130 is placed when placing the cradle 130 on a desk 190, it becomes possible to confirm the contents of the display on the liquid-crystal monitor 183 by utilizing the mirror 188.

Figure 18:
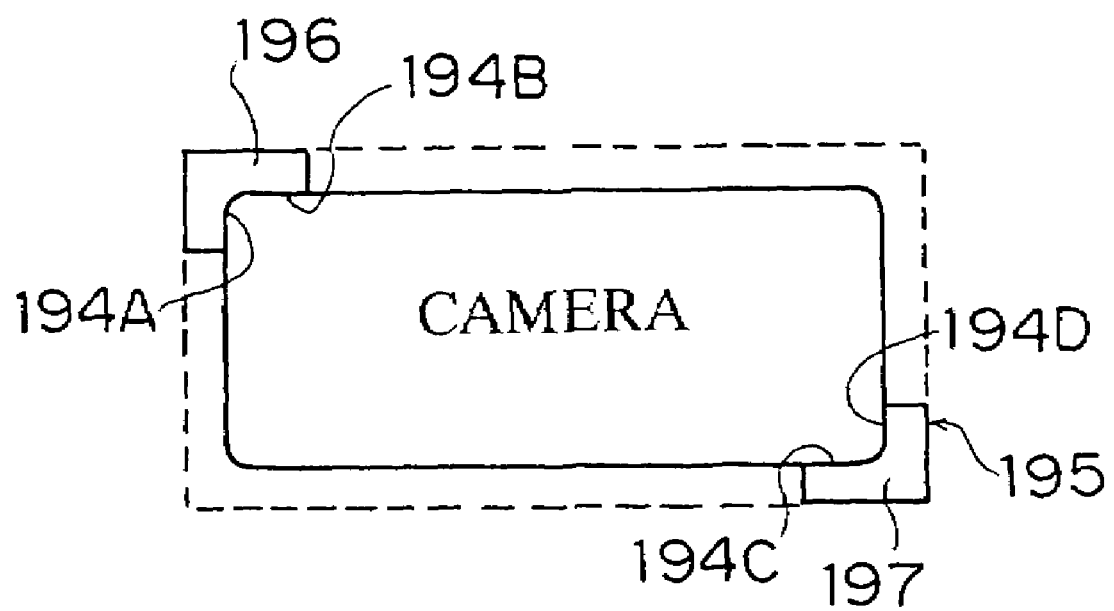
FIG. 18 is a plan view showing a cradle for a digital camera and the digital camera according to a further embodiment of the present invention.

The applicable range of the present invention is not limited to the above-described embodiments. In the above-described cradle 130, the four corners of the camera 110 are held by four L-shaped column parts 138, 139, 140 and 141. However, in practicing the present invention, the cradle may have any structure unless the camera is not unstable when the movable walls are opened, and as its concrete form, various structures may be available. Not to deteriorate the camera holding in the cradle having movable wall surfaces, as shown in FIG. 18, it is desirable that the cradle 195 has standing walls (fixed standing walls) 196 and 197 each of which holds two sides ((194A, 194B) or (194C, 194D)) forming a corner of at least a pair of diagonal corners among four corners of the camera 110.

Not shown in the figures, though, if a battery cover is provided on a side surface of the camera, it is preferable to constitute the portion of the wall part of the cradle that covers the battery cover by the movable wall. According to this configuration, the battery changeover can be performed while the camera is being inserted into the cradle. Therefore, this is the effective configuration especially for a camera system having a function that the charging of the rechargeable battery in the camera is performed by the cradle.

As described above, according to the present invention, the cradle for the digital camera can be fixed to the tripod while the digital camera is being inserted into the cradle because the tripod screw hole is provided to the cradle. This makes it possible to freely set the direction or angle of the camera by using the platform of the tripod, thus increasing the flexibility in setting arrangement. Long-duration photographing also becomes possible by supplying power to the digital camera from the cradle.

According to another aspect of the present invention, since the cradle has a structure that a part of the wall surfaces is movable, it is possible to mount or demount the removable media, confirm the contents of display, attach or detach the connectors, change the battery or the like, while the camera is being inserted into the cradle. Therefore, in the case where the camera and a personal computer are connected for communication by using the cradle and image transmission or the like is performed therebetween, since it is possible to mount or demount the recording media while the camera is being inserted into the cradle, the camera can be used as a card reader.

In the case where the camera inserted into the cradle is placed on a desk or the like to perform photographing or image reproduction independently, namely, without connection with a personal computer, or in the case where the camera is connected to a personal computer and is controlled from the personal computer, the display screen of the camera can be observed by opening the movable wall of the cradle to open up the image display screen of the camera.

In the cradle of the present invention, by providing standing walls each of which holds two sides forming a corner of at least a pair of diagonal corners among four corners of the digital camera whose cross section has a generally rectangular shape, the camera holding cannot be deteriorated even if the movable walls are opened.

According to another aspect of the present invention, the cradle has a structure that the movable walls can be also used as a simple tripod, and therefore, it becomes possible to freely control the angle of the camera inserted into the cradle.

According to a further aspect of the present invention, since the wall surface of the cradle corresponding to the image display part of the digital camera is constituted by a movable wall and a mirror is provided on the inside (the side facing the image display part) of the movable wall, even in a narrow space, the image display screen can be confirmed by means of the mirror by adjusting the angle of the movable wall.

According to the present invention, the range of uses of the cradle becomes wider, and its conveniences are increased.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A cradle for a digital camera, comprising:
a bottom;
at least two L-shaped column portions which hold a digital camera having a cross section that is generally rectangular in shape, each of which holds two sides of at least one pair of diagonal corner portions of the digital camera;
a wall surface extending upwardly from sides of the bottom which connects the L-shaped column portions and surrounds the digital camera; and
an opening though which the digital camera is inserted into the cradle,
wherein the bottom, the L-shaped column portions, the wall surface, and the opening of the cradle form a lidless-shaped box which is adapted to cover a part of the digital camera while another part of the digital camera remains exposed, when the digital camera is mounted in a recess of the lidless-shaped box, and
a portion of the wall surface which extends upwardly from a portion of one side of the bottom and is abutting against a first one of the L-shaped column portions is a movable wall which is pivotable about an axis located near the bottom of the cradle.

2. The cradle as set forth in claim 1, wherein a portion of the wall surface of the cradle covering a media insertion part provided in the digital camera is constituted by the movable wall, and
a media can be removed from or inserted into the media insertion part with the digital camera mounted in the recess by moving the movable wall to uncover the media insertion part.

3. The cradle as set forth in claim 1, wherein the wall surface includes four L-shaped column portions,
wherein the movable wall is disposed on one side of the bottom between adjacent two of the L-shaped column portions.

4. The cradle as set forth in claim 3, wherein:
the movable wall is pivotably supported by the two L-shaped column portions;
an angle adjustment device which is capable of adjusting a stop angle of the movable wall is provided to one of the two L-shaped column portions; and
the movable wall is capable of being used as a leg portion for supporting the cradle.

5. The cradle as set forth in claim 1, wherein:
operation buttons for operating the digital camera are provided on the another part of the digital camera which remains exposed while the digital camera is mounted in the recess;
a portion of the wall surface of the cradle which covers an image display part provided to the digital camera is constituted by the movable wall; and
a user can operate the digital camera using the operation buttons with viewing the image display part in a state where the digital camera is mounted in the recess when the movable wall is moved to uncover the image display part.

6. The cradle as set forth in claim 1, further comprising:
a first communication device which performs communication with the digital camera mounted in the recess;
a second communication device which performs communication with an external device such as a personal computer; and
a power supply terminal which supplies power to the digital camera mounted in the recess.

7. A cradle for a digital camera, the cradle comprising:
a rectangular-shaped bottom;
four non-movable L-shaped column portions standing upward from corners of the rectangular-shaped bottom; and
four wall portions which are disposed between adjacent two non-movable L-shaped column portions of the four non-movable L-shaped column portions and respectively standing upward from four sides of the rectangular-shaped bottom; and
an opening though which the digital camera is inserted into the cradle, wherein
the rectangular-shaped bottom, the four non-movable L-shaped column portions, the four wall portions, and the opening of the cradle form a lidless-shaped box which is adapted to cover a part of the digital camera while another part of the digital camera remains exposed, when the digital camera is mounted in a recess of the lidless-shaped box,
at least one of the four wall portions is a movable wall portion that, in closed position, is flush mounted between two of the non-movable L-shaped column portions to form a closed wall surface on one side of the cradle,
the movable wall portion is pivotably supported by a pin projecting from each opposite lateral edge of the movable wall portion into the non-movable L-shaped column portions on each side thereof, and
when the movable wall portion is pivoted outwardly from the closed flush position, a central portion of one side of the digital camera previously covered by the movable wall portion is exposed, while edge portions of the one side of the digital camera on each side of the movable wall portion remain covered by the L-shaped column portions.

8. The cradle as set forth in claim 7, wherein one of the four wall portions of the cradle covering a media insertion part provided in the digital camera is constituted by the movable wall portion, and
a media can be removed from or inserted into the media insertion part with the digital camera mounted on the recess by moving the movable wall portion to uncover the media insertion part.

9. The cradle as set forth in claim 7, wherein:
the movable wall portion is rotatably supported by two adjacent L-shaped column portions;
an angle adjustment device which is capable of adjusting a stop angle of the movable wall is provided to one of the two L-shaped column portions; and
the movable wall portion is capable of being used as a leg portion for supporting the cradle.

10. The cradle as set forth in claim 7, wherein:
operation buttons for operating the digital camera are provided on the another part of the digital camera which remains exposed while the digital camera is mounted on the recess;
one of the four wall portions of the cradle which covers an image display part provided to the digital camera is constituted by the movable wall portion; and
a user can operate the digital camera using the operation buttons with viewing the image display part in a state where the digital camera is mounted in the recess when the movable wall portion is moved to uncover the image display part.

11. The cradle as set forth in claim 7, comprising:
a first communication device which performs communication with the digital camera mounted in the recess;

a second communication device which performs communication with an external device such as a personal computer; and a power supply terminal which supplies power to the digital camera mounted in the recess.

12. The cradle for a digital camera according to claim 5, further comprising:

a mirror attached to the movable wall so that when the movable wall is in a closed position, the mirror is capable of facing directly against the image display part of the digital camera.

13. The cradle as set forth in claim 1, wherein the wall surface of the cradle covering a battery insertion part provided in the digital camera is constituted by the movable wall, and a battery can be removed from or insert into the battery insertion part with the digital camera mounted on the recess by moving the movable wall to uncover the battery insertion part.

14. The cradle as set forth in claim 1, wherein the wall surface of the cradle covering an input-output terminal part for data exchange provided in the digital camera is constituted by the movable wall, and a plug of cables can be connected with the input-output terminal part with the digital camera mounted in the recess by moving the movable wall to uncover the input-output terminal part.

15. The cradle as set forth in claim 10, further comprising a mirror attached to the movable wall portion in a manner that when the movable wall portion is in a closed position, the mirror is capable of facing directly against the image display part of the digital camera.

16. The cradle as set forth in claim 7, wherein the wall surface of the cradle covering a battery insertion part provided in the digital camera is constituted by the movable wall, and a battery can be removed from or insert into the battery insertion part with the digital camera mounted on the recess by moving the movable wall to uncover the battery insertion part.

17. The cradle as set forth in claim 7, wherein the wall surface of the cradle covering an input-output terminal part for data exchange provided in the digital camera is constituted by the movable wall, and a plug of cables can be connected with the input-output terminal part with the digital camera mounted in the recess by moving the movable wall to uncover the input-output terminal part.

* * * * *